Dec. 30, 1941.    N. A. TORNBLOM    2,268,355
BOX WITH CABLE CONNECTORS
Filed Jan. 26, 1940
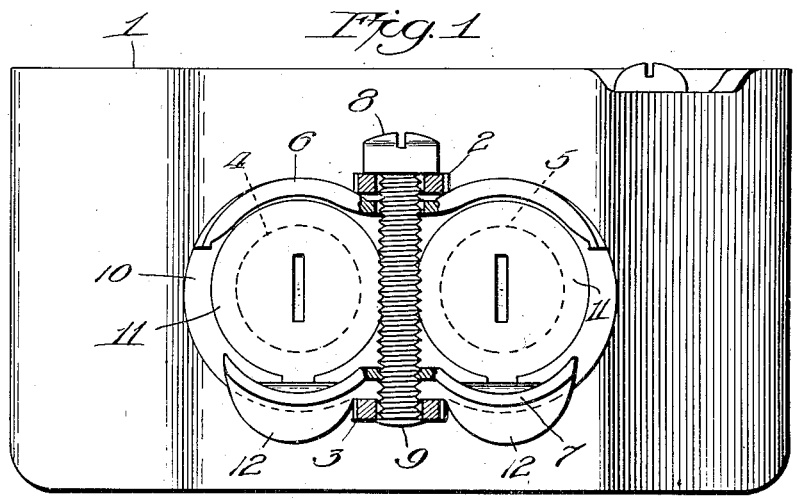
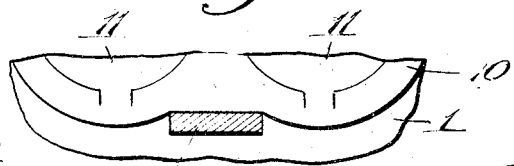
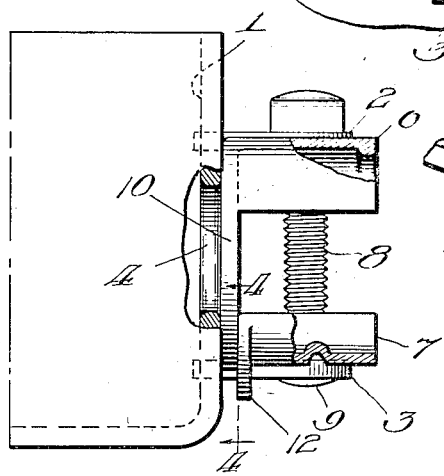
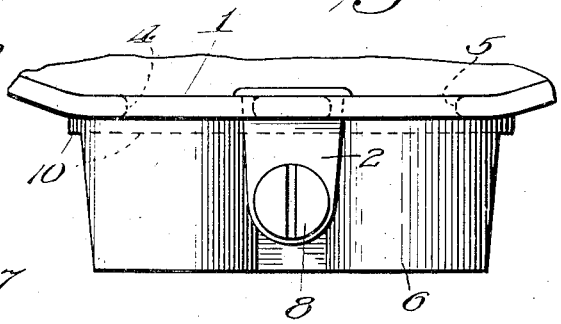
Inventor
Nils A. Tornblom,
by Wm. F. Freudenreich,
Atty.

Patented Dec. 30, 1941

2,268,355

UNITED STATES PATENT OFFICE 2,268,355

BOX WITH CABLE CONNECTORS

Nils A. Tornblom, Chicago, Ill., assignor to Appleton Electric Company, a corporation of Illinois Application January 26, 1940, Serial No. 315,663

4 Claims. (Cl. 285—47.2)

The present invention has for its object to produce a simple and novel device located on the outside of a connection box or the like for effectively securing a pair of cables or conduits to the box.

A further object of the present invention is to produce a simple and novel connector for cables and conduits, adapted to be mounted on the exterior of a box wall or the like, which shall be capable of securing either one or two cables or conduits, without leaving an objectionable opening in the wall in the event that there is only a single cable or conduit.

A further object of the present invention is to produce a simple and novel connector which is adapted to accommodate cables or conduits coming within a wide range of diameters.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an elevational view of an outlet box having one of my improved attachments thereon, portions of the attachment being broken away in order better to illustrate the construction; Fig. 2 is a top plan view of the connector attachment, together with an adjacent fragment of the box; Fig. 3 is a side view of the box and connector, only a fragment of the box being shown, and parts being broken away to clarify some of the details; and Fig. 4 is a section on line 4—4 of Fig. 3.

Referring to the drawing, I represents a wall of an outlet box or other device. Projecting outwardly from this wall are two parallel lugs or ears 2 and 3, arranged one above the other. In the zone between the ears are two smooth-edged openings 4 and 5, symmetrically disposed with respect to a vertical line passing through both ears and lugs. Between the ears are arranged two clamps 6 and 7, one of which underlies and contacts with the ear 2 while the other overlies the ear 3. The two clamps are long enough so that they may be caused to grip a pair of cables or conduits brought into registration with the openings 4 and 5.

A long screw 8 extends vertically through both lugs and through the middle of each of the clamps. The holes in the lugs and in the upper clamp are sufficiently large so that the screw may move freely in the lengthwise direction through the same, but the hole in the lower clamp is screw-threaded so that this clamp acts as a nut complementary to the screw. The lower end of the screw may be riveted over, as indicated at 9, to prevent it from being pulled up through the lower ear or lug, or any other suitable means may be employed yieldingly or otherwise to hold the screw against bodily upward movement.

Since the screw does not serve to support the weight of the upper clamp, some means must be provided to hold this clamp up. Obviously, a compression spring may be placed around the screw between and in engagement with both of the clamps, and serve the dual purpose of holding the upper clamp against the upper ear or lug and exerting a downward pressure on the screw. In the particular arrangement shown, however, the upper clamp is provided at the side or edge in contact with the wall with a deep wide skirt or flange 10 that lies flat against the wall 1 and serves as a cover for the openings 4 and 5. This skirt or flange is also so shaped that when the upper clamp is in engagment with the under side of the upper lug as shown in Fig. 1, the bottom edge of the skirt or flange rests upon the lower lug 3. The contour of the lower edge of the skirt or flange is preferably such that the skirt or flange is interlocked with the lower lug against lateral displacement in the plane of the skirt or flange. The skirt or flange is provided with two knockouts 11, each somewhat larger than and concentric with one of the openings 4 and 5. Thus, when the device reaches the consumer, the knockouts form covers or closures for the openings 4 and 5. Upon prying out the knockouts, conductors may be inserted through the openings 4 and 5. Since the knockouts are larger than the openings in the box wall, any jagged edges left in the skirt or flange, by reason of the removal of the knockouts, are spaced sufficiently far from the circumferences of the openings to insure that there will be no danger of injury of insulation on the conductors through contact with the metal bounding the knockout openings.

It will be seen that two similar cables or conduits coming anywhere within a fairly wide range of diameters may be securely gripped between the two clamps. Should it be desired to connect only a single cable or conduit, only one knockout need be removed, so that the remaining knockout continues to act as a closure for the corresponding opening in the box wall.

It will be seen that the lower clamp is so proportioned that its inner or rear edge slidably engages the outer face of the flat skirt or flange and that the clamp itself is provided with the usual downwardly projecting flanges 12 adjacent to the inner or rear edge; the flanges 12 also lying flat against the flange or skirt 10 and serving to close those portions of the knockout openings that may lie below the cables or conduits when the latter are pressed upwardly against the clamp 6 by means of the lower clamp. It will thus be seen that the flanges 12 will usually better serve their intended purpose than is the case where they must engage with the face of the box wall itself, because the skirt or flange 10 may be made quite flat and smooth and thus insure close contact betwen the same and the flanges on the lower clamp.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with a wall having a pair of ears projecting therefrom one above the other and an opening in the zone between said ears, of a pair of complementary clamps engaged with a face of the wall between said ears and movable relatively from and toward each other, and a screw extending through both ears and through both clamps and engaged with threads in one of the clamps to produce relative movements between the clamps upon turning the screw.

2. The combination with a wall having a pair of spaced parallel ears projecting therefrom and an opening in the zone between the ears, a pair of clamps arranged between said ears, one of said clamps engaging one of the ears and having a skirt extending across said opening and into engagement with the other ear, and a screw extending through both ears and through both clamps and adapted to move the latter toward and from each other when the screw is turned in one direction or the other.

3. The combination with a wall having a pair of spaced parallel ears projecting therefrom and two openings in the zone between and disposed on opposite sides of a line connecting the ears, a pair of clamps arranged between said ears, one of said clamps engaging one of the ears and having a skirt extending across said openings and into engagement with the other ear between the wall and the other clamp, the last-mentioned clamp having a flange lying flat against said lug and projecting from the side of that clamp farthest from the other clamp, the wall edges bounding said openings being smooth, said skirt having therein knockouts registering with and larger than said openings, and a screw extending through both ears and through both clamps and adapted to move the latter toward and from each other when the screw is turned in one direction or the other.

4. The combination with a box wall having an opening through the same, of a pair of complementary clamps on the outer side of said wall, respectively above and below said opening, one of said clamps having at its inner edge a deep skirt lying flat against said wall over said opening, said skirt having a knockout registering with said opening in the wall, the other clamp engaging at its inner edge with the face of said skirt, and means to support said clamps from said wall to produce relative clamping movements between the same in a direction to grip a cable extending through the opening in the wall and the opening left in said skirt upon the removal of the knock-out in the latter.

NILS A. TORNBLOM.